United States Patent [19]
Allington

[11] 3,847,785
[45] Nov. 12, 1974

[54] ELECTROPHORESIS APARATUS
[75] Inventor: William B. Allington, Lincoln, Nebr.
[73] Assignee: Instrumentation Specialties Company, Lincoln, Nebr.
[22] Filed: Feb. 14, 1972
[21] Appl. No.: 226,016

[52] U.S. Cl. .............................. 204/299, 204/180 G
[51] Int. Cl. ............................................. B01k 5/00
[58] Field of Search ............. 204/180 R, 180 G, 299

[56] References Cited
UNITED STATES PATENTS
| | | | |
|---|---|---|---|
| 3,384,564 | 5/1968 | Ornstein et al. | 204/180 G |
| 3,453,200 | 7/1969 | Allington | 204/180 G X |
| 3,553,097 | 1/1971 | Buchler | 204/299 |
| 3,616,454 | 10/1971 | Levy | 204/299 |

Primary Examiner—John H. Mack
Assistant Examiner—A. C. Prescott
Attorney, Agent, or Firm—Vincent L. Carney

[57] ABSTRACT

To separate and collect different molecular species in a mixture of the species, the mixture is first electrophoresed in a gel such as a polyacrylamide gel to obtain good resolution of at least some of the different species and then electrophoresed into a collecting medium having bulk flow characteristics such as a density gradient column so that the different species can be scanned and collected using techniques and apparatus that require bulk flow of the medium, with further electrophoresis in the collecting medium providing further separation.

23 Claims, 5 Drawing Figures

ELECTROPHORESIS APARATUS

This invention relates to techniques and apparatuses for electrophoresis.

In the electrophoresis of molecular species, a sample containing a mixture of molecular species is deposited on an anticonvection medium which may be solid, semisolid or liquid, and a potential is applied across the sample and the medium. The different molecular species migrate at different rates through the medium so as to form generally flat zones, migrating in the direction of and being perpendicular to the electric field intensity, each zone containing a different species. After the different species have been separated, they are collected into different containers. If the medium is liquid, such as a liquid density gradient column, the different molecular species are generally collected with conventional fraction collectors that detect zones containing different species by light absorbance in the zone and channel the liquid containing each zone into a different container.

The medium is selected to provide the necessary separation in accordance with the ability of the medium to support different migration rates of different molecular species. Solids and semisolids are selected, under some circumstances, to serve as the medium rather than liquids because of special characteristics possessed by the solids and semisolids.

One prior art technique for collecting the different species from a solid or semisolid medium, after the species have been separated by electrophoresis, is to position a collecting plate having channels filled with a buffer solution against the solid or semisolid medium with different channels in the plate aligned with the zones of the different species and to move the species into the channels, by applying an electric potential across the channels and the medium in a direction perpendicular to the potential that was applied to separate the species into the generally flat zones. The species are then individually removed from the channels.

This prior art method and apparatus have the disadvantage of excessively diluting the molecular species in the buffer solution and in not permiting adequate observation and checking of the zones before the irreversible collection of the different species.

To provide better collection of the different species, one prior art technique and apparatus for separating and collecting different molecular species by electrophoresis relies upon density gradient columns which exibit bulk flow characteristics so as to be suitable for collection in commercial fraction collectors even though a higher resolution of the same molecular species of interest can be obtained from a solid or semisolid medium.

This prior art technique has the disadvantage of not permitting the satisfactory separation and collection of some species because they are too closely spaced to be adequately separated in a density gradient column.

Accordingly, it is an object of the invention to provide a novel technique for electrophoresis.

It is a further object of the invention to provide novel apparatuses for electrophoresis.

It is a still further object of the invention to provide a novel technique and apparatus for collecting molecular species that have been separated by gel electrophoresis.

It is a still further object of the invention to provide electrophoresis techniques and apparatus for increasing the number of molecular species that can be separated and collected.

It is a still further object of the invention to provide for the collection of molecular species separated by gel electrophoresis without excessive dilution of the molecular species.

It is a still further object of the invention to provide for the monitoring of electrophoresis processes in which the separation takes place at least partly in a solid or semisolid.

In accordance with the above and further objects of the invention, different species of the molecules are, by electrophoresis, separated into zones, each including one or more different molecular species, from a mixture of molecular species in at least two different media, in succession, one medium, hereinafter called a separating medium, being a solid or semisolid which serves primarily to separate the molecular species into different zones and another medium, hereinafter called a collecting medium, being capable of bulk flow so as to serve primarily as a good medium for collecting the zones in different containers with the separated zones being moved from one medium to the other by electrophoresis.

In one embodiment, a mixture of different species of molecules, a solid or semisolid separating medium and a collecting medium capable of bulk flow such as a liquid density gradient column are electrically connected in series with the mixture of different species being at one end of the separating medium and the collecting medium being at the other end so that the different molecular species are separated into zones in the separating medium and the zones are moved into the collecting medium one at a time for further separation and collection. The migration velocities provided by the two media to the different species may be adjusted to change the concentration and spacing of the molecular species at the interface between the media and the two media may be selected to each provide some special resolution of components or other special effects during the electrophoresis. Moreover, it has been found that a third medium which provides a greater velocity of migration to the molecular species than at least the separating medium and which is located between the separating and collecting media provides, under some circumstances, still greater resolution of the molecular species.

In another embodiment, the different species of the mixture of molecular species are caused to migrate at different velocities from the first to the second end of the separating medium by an electric field across the separating medium from the first to the second end to form generally flat discrete zones perpendicular to the electric field intensity vectors, each containing different molecular species. After the zones are formed in the separating medium, the separating medium is positioned with one of its sides next to a collecting medium so that the zones are generally perpendicular to the interface between the separating and collecting media and an electric field is applied across the separating and collecting media, in series, to move the zones, simultaneously, in parallel, from the separating medium into the collecting medium.

In one type of electrophoresis apparatus usable with either of the two above-mentioned embodiments of the invention, the zones are scanned by a light absorbance optical cell as they move from the separating medium into the collecting medium to locate the zone or zones of interest. In another type of apparatus, or as an addition to the last-mentioned type of apparatus, a liquid, more dense than the collecting medium, is inserted into the bottom of the vessel containing the collecting medium to float the collecting medium upwardly through a concentration sensor that indicates the concentration of the zones as the collecting medium moves upwardly. With this type of apparatus, the medium is, in one mode of operation, moved into a reservoir during the scanning, and if the sensor indicates that the zones are insufficiently separated to complete the collection of the different molecular species, returned to the vessel for further electrophoresis.

When the separation is sufficiently complete, each zone of the collecting medium is deposited in a different container by a conventional fraction collector that: (1) senses the different zones from differences in their ultraviolet light absorbances as the collecting medium flows to a downspout; and (2) moves different containers under the downspout to bulk the different zones that it has sensed.

Because a plurality of different media are used in the electrophoresis technique and apparatus of this invention, several advantages are obtained, such as: (1) different molecular species are separated by electrophoresis in a solid or a semisolid medium and collected into separate containers without excessive dilution or the fragmentation of the solid or semisolid medium; (2) the molecular species that have been separated by electrophoresis in a solid or semisolid medium are collected by standard fraction collectors; (3) the zones that are separated by electrophoresis in a solid or semisolid medium are readily scanned and observed; (4) the beneficial results of collection in a density gradient column and the beneficial results of separation in a gel are both provided, and (5) more complete resolution of some mixtures of molecular species into their different species than can be obtained by electrophoresis in a single gel or density gradient column is provided.

The above and other features of the invention will be better understood from the following detailed description when considered with reference to the accompanying drawings, in which.

GENERAL METHOD

Figure 1:
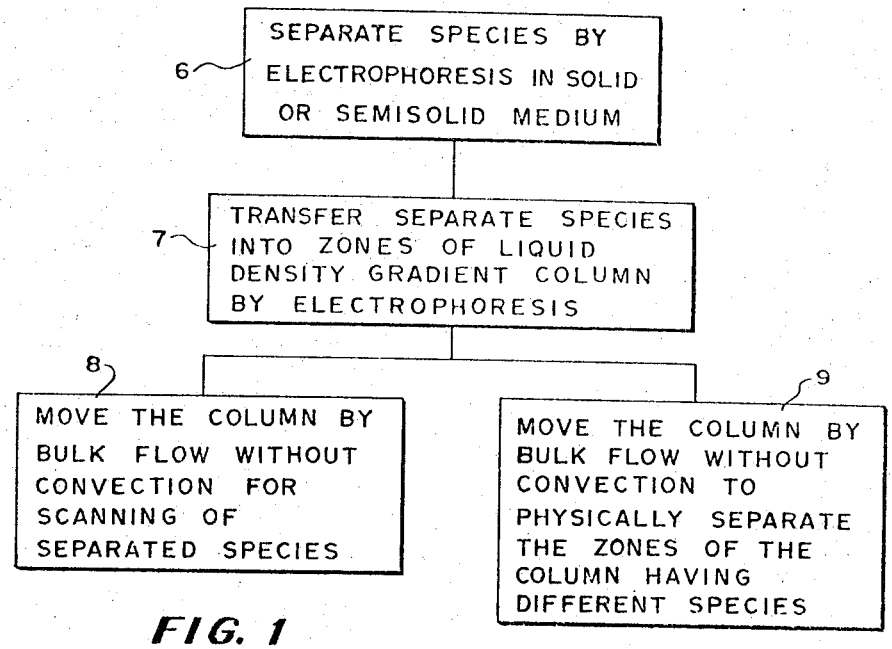
FIG. 1 is a block diagram illustrating the steps of an electrophoresis process in accordance with an embodiment of the invention.

In FIG. 1, there is shown a block diagram broadly illustrating two sequences of steps in accordance with the invention, with both sequences of steps resulting in the separating of different molecular species or chemical components of a mixture of molecular species or chemical compounds, one of the sequences of steps permitting the convenient observation of the separated molecular species after their separation and the other sequence permitting the convenient collection of the separated molecular species after their separation.

As illustrated at 6 in FIG. 1, the first step in observing or collecting the different molecular species from the mixture of molecular species in accordance with the invention is to separate the species by gel electrophoresis. The process of this invention is intended to be used to separate molecular species which can be separated better by electrophoresis in a solid or semisolid medium than by electrophoresis in a liquid density gradient column. This characteristic is true of many different molecular species that have some similarities or are considered closely spaced molecularly so as to benefit from the higher resolution available from electrophoresis in certain solid mediums.

Several solid and semisolid mediums that provide superior separation for some closely spaced molecular species are known, such as for example, polyacrylamide gels, dextran particles, cellulose and agarose gels. A medium of this type, when used to perform the first step illustrated in FIG. 1, will hereinafter be referred to as the separating medium. The process and apparatus of this invention have particular utility when the most suitable separting medium is a solid or semisolid so as to make the collection of the individual species difficult.

Broadly, materials suitable for the separating medium in practicing the first step illustrated in block 6 have the characteristics of: (1) being incapable of bulk flow, or having poor bulk flow characteristics; (2) resisting convection; and (3) having physical, chemical or both physical and chemical interaction with the species to be separated, which interaction is reversible and provides the different rates of migration to different species. More specifically, they are typically solids or semisolids that have some special characteristic which enable them to provide high resolution of some closely spaced molecular species during electrophoresis. A typical special characteristic is the ability to impede electrophoretic migration by molecular sieving. Because these special mediums are not capable of bulk flow, or have poor bulk flow characteristics, it is difficult to collect the different species and, under some circumstances, to observe them after they are separated in the medium.

As illustrated at 7 in FIG. 1, the second step in observing or collecting the different molecular species from the mixture of molecular species in accordance with the invention is to transfer the separated molecular species into zones of a liquid density gradient column by electrophoresis. While in the preferred embodiment illustrated in FIG. 1 the species are transferred into a liquid density gradient column, the invention is broader than this. The second medium, which may be called a collecting medium to distinguish it from the separating medium used in the first step, is selected primarily for its ability to receive the separated molecular species and for the ease with which the separated molecular species are observed and collected into different containers when in this medium.

Broadly, the collecting medium, is either liquids or granular, and resists convection. It is typically a density gradient column.

A principal charateristic of the collecting medium is its ability to be moved by bylk flow. To have sufficient bulk flow characteristics, the collecting medium should be capable of being moved upwardly by the insertion of a more dense liquid beneath it without mixing the zones containing different molecular species. Preferably, the collecting medium has bulk flow characteristics that permit it to be moved from a lower reservoir to a higher reservoir through a tube that is narrower than the lower and higher reservoirs and returned to the lower reservoir by the injection and withdrawal of the dense liquid into and from the bottom of the lower reservoir without substantially altering its density gradient in the lower reservoir.

Some materials used as media in electrophoresis processes have more than one form or phase and the different forms of phases have different characteristics affecting their selection as separating or collecting media. For example, polyacrylamide may be granular, which is considered to be a semisolid herein, or may be solid, and if solid, may have different degrees of stiffness.

Moreover, some materials or forms of materials may, under some circumstances, serve as separating media and, under other circumstances, serve as collecting media. Some granular materials, such as dextran gel particles, are this type of material, being semisolids with bulk flow characteristics that permit collection of the species in fraction collectors of the type that require bulk flow but do not perform as well as other materials, such as liquid density gradient columns, during collection by such fraction collectors. Such materials may be used as a collecting medium when they provide some special benefit that justifies their selection over materials having better bulk flow characteristics and under other circumstances are used as a separating medium together with a collecting medium having better bulk flow characteristics.

To provide adequate bulk flow characteristics to columns of some granular separating media, a special technique is used. In this technique, the granules are not displaced from the column into the fraction collector but instead the liquid electrolyte around the granules is removed from the granules and channeled into the fraction collector together with the separated zones, either by draining the electrolyte and zones of molecular species from the bottom or displacing them in an upward direction by introducing a more dense liquid in the bottom of the column.

In performing the second step 7 of the processes illustrated in FIG. 1, the different molecular species are moved from the separating medium into the collecting medium as distinct zones so that, as the zones of each molecular species move from the separating medium to the collecting medium, the identity of each zone is preserved, with the molecular species continuing to be spaced apart in the collecting medium.

In one embodiment, the separating medium forms one vertical column, hereinafter called a separating column, and the collecting medium forms another column, hereinafter called a collecting column, contiguous with the separating column, being either above or below the separating column. The zones are electrophoresed from one end of the separating column through the separating column, and into the collecting column in a direction perpendicular to the zones by a source of potential applied across both columns, with the two columns being electrically and physically in series, so that horizontal zones containing each molecular species are formed in the separating medium and moved one by one as descrete horizontal zones, spaced vertically from each other, into the density gradient column as the different molecular species migrate from one end of the separating column to positions in the collecting column.

In another embodiment, the horizontal zones are formed in the separating medium and then moved simultaneously, a parallel, in the direction of a plane parallel to the zones, into the collecting medium. In this embodiment, the zones containing the different species are first formed by electrophoresis in the separating medium by a potential applied from the top to the bottom of the separating column and then the separating column is placed with one of its sides contiguous with the side of a collecting column to form a new path for the migration of the different molecular species in a new direction perpendicular to the previous direction into the collecting column by electrophoresis, with a potential being applied across the two columns, in series from an outer side of the separating column to an outer side of the collecting column.

In the first embodiment, two other effects take place, which are: (1) further separation normally occurs between the different species by further electrophoretic action as the zones move in the collecting medium; and (2) the concentration of the individual species and the distance between zones containing different species changes or remains the same depending on the ratio of the velocities of migration of the species in the separating and collecting media as the zones move through the interface between the separating and collecting media.

Firstly, the further separation of the different molecular species occurs by electrophoresis in the collecting medium while the zones are in the collecting medium and therefore the collecting medium may be selected from those media having bulk flow characteristics to provide better resolution of the different species. The separating medium is selected and used because it has the ability to separate certain of the molecular species with a greater degree of resolution than the collecting mediuim, but under some circumstances, the careful selection of the collecting medium provides resolution of other species to a degree that is not obtainable in the separating medium. Stated another way, the separating medium may be selected to provide good resolution between some species and the collecting medium may be selected to provide good resolution between other species, with the combination of media providing better overall resolution between the different molecular species than is provided by either one of the media alone.

Secondly, the selection of the migration rate of the molecular species in the separating medium and the collecting medium enables the concentration within the zones and the distance between zones to be changed at the interface between the separating and collecting media. If the collecting medium provides faster velocity to the zones of the molecular species than the separating medium, the concentration of the species within each zone is reduced and the distance between zones is increased at the interface between the two media. If the velocity of the species in the collecting medium is less than in the separating medium, the concentration of the species within a zone is increased and the distance between zones is descreased. Of course, if the velocity is the same in the collecting medium as in the separating medium, the concentraion within each zone and the distance between zones remains the same at the interface.

The velocity of migration of the molecular species in the media is controllable by techniques known in the art such as by changing the conductivity of pH of the media, which may be accomplished by known means. Moreover, one or more additional mdeia may be placed between the separating and collecting media and the additional media may provide a velocity of migration to the molecular species that is different from their velocity in one or both of the separating and collecting media. It has been found that a further resolution of the species is obtainable by including such an additional medium with a different conductivity than the separating and collecting media.

In the second embodiment, the collecting medium is usually formed of a granular material such as dextran particles, which granular material exhibits suitable bulk flow characteristics. Several suitable granular materials, such as dextran particles and glass particles, are known. Of course the choice of materials for the collecting medium in the first embodiment is greater than in the second embodiment and includes both liquid and granular materials.

When the second step illustrated at 7 in FIG. 1 has been performed and the zones of the different molecular species are in the collecting medium, either of two different additional steps or both of the two additional steps are performed in sequence. One step, illustrated at 8 in FIG. 1, is to observe the different species; the other step, illustrated at 9, is to collect the different species by physically separating them into different containers.

The zones are observed to determine the amount of separation between zones and the number of species that have been separated before attempting to collect the different species in separate containers. In one embodiment, the collecting medium containing the zones is moved by bulk flow through an optical cell which measures light absorbance or some other characteristic that indicates changes in the chemical components. The movement of the collecting medium may be in any direction, with precautions being taken to prevent any turbulance that will disturb the bulk flow of the medium and the molecular species contained in it. In another embodiment, the zones are scanned as they are moved through the collecting medium by electophoresis.

To collect the different species, the collecting medium is moved by bulk flow through an orifice, with each portion of the collecting medium containing a different zone or each portion containing certain zones or groups of zones that are to be collected together being channeled into a different container. Several methods and apparatuses are known in the art for making this type of collection, one method and apparatus being disclosed in U.S. Pat. No. 3,161,639 and another being disclosed in U.S. Pat. No. 3,453,200.

ELECTROPHORESIS APPARATUS

Figure 2:
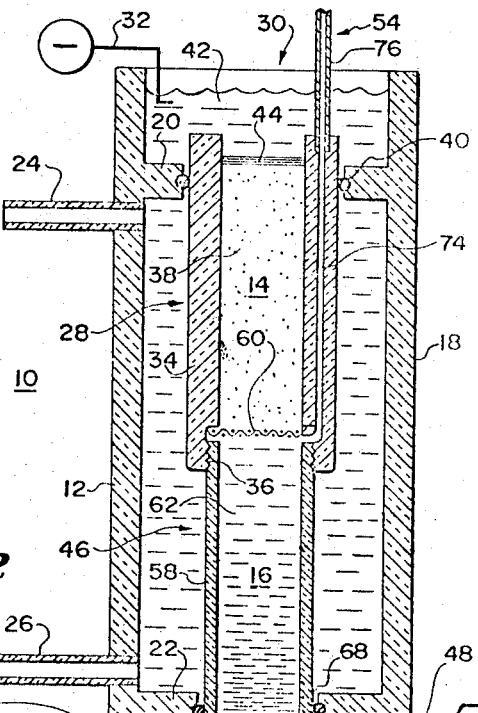
FIG. 2 is a fragmentary, elevational, sectional view, taken along a vertical axis of an electrophoresis apparatus that includes one embodiment of the invention.

In FIG. 2, there is shown in a sectional view an electrophoresis apparatus 10 having as its principal parts a tubular frame 12, a separating section 14 mounted in the upper part of the tubular frame 12, and a collecting section 16 mounted in the lower part of the tubular frame 12.

To support the separating section 14 and the collecting section 16 of the electrophoresis apparatus 10, the tubular frame 12 includes a smooth cylindrical outer surface 18 adapted to be clamped in any suitable clamping apparatus (not shown) to hold the frame 12 in a vertical position, a first inwardly extending flange 20 located inside of the frame near its upper end to define a first circular opening for receiving a portion of the separating section 14, and a bottom inwardly extending flange 22 defining a second circular opening for receiving a portion of the collecting section 16, the first and second circular openings being coaxial with the frame, with the first circular opening having a larger diameter than the second circular opening.

To cool the separating section 14 and the collecting section 16, the inner walls of the frame 12 define a water jacket having a first tubulation 24 extending radially through the wall of the frame at one end just below the upper flange 20 and a second tubulation 26 extending radially through the wall at the other end just above the second inwardly extending flange 22 to enable a coolant to be pumped through the second tubulation 26, upwardly through the frame 12 around portions of the separating and collecting section 14 and 16 and out of the first tubulation 24.

The separating section 14 includes a cylindrical separating column 28, an upper buffer solution section 30 and a source of electrical potential 32 having a negative polarity.

The cylindrical separating column 28 includes an upper cylindrical tube 34 extending through the first circular opening at its upper end and being internally threaded at its lower end to engage the collecting section 16 at 36, with a column of solid or semisolid separating medium 38 being within and substantially filling the upper cylindrical tube 34. An o-ring 40 seals outer surface of the cylindrical upper tube 34 against the first inwardly extending flange 20 and supports the separating column 28. In this position, the lower portion of the separating column 28 is surrounded by the coolant below the first flange 20 and the upper portion of the separating column 28 extends above the first flange 20 into the buffer section 30.

To provide one electrical connection to a source of electrical potential for electrophoresis, the buffer section 30 contains a buffer solution 42 and an electrode connecting the source of potential 32 to the buffer solution with the buffer solution 42 being retained within a compartment defined by a portion of the cylindrical walls of the frame 12, the top surface of the first inwardly extending flange 20 of the frame 12, the o-ring 40, a portion of the upper cylindrical tube 34 and the top of the separating medium 38. A sample 44 containing a mixture of molecular species that are to be separated is suspended in a liquid more dense than the buffer solution and supported directly on top of the separating medium 38.

The collecting section 16 includes a cylindrical collecting column 46, a lower buffer solution section 48, a fluid control section 50, a source 52 of positive potential, and a fluid exit section 54.

The cylindrical collecting column 46 includes a lower cylindrical tube 58 having its central opening aligned with the central opening of the upper cylindrical tube 34 of the separating column 28, a porous screen 60 on top of the lower cylindrical tube 58 and beneath the separating medium 38, a collecting medium 62 within the lower cylindrical tube 58 and beneath the porous screen 60, and a semipermeable membrane 64 closing the lower end of the lower cylindrical tube 58.

The lower cylindrical tube 58 has external threads on its upper end engaging the internal threads at 36 on the upper cylindrical tube 34 of the separating column 28 to form a continuous opening along the longitudinal axis of the frame 12 for migration of the molecular species of the sample 44 and is supported on the second inwardly extending flange 22 at its lower end by an o-ring 68 which also closes the bottom of the water jacket within the frame 12 to prevent the escape of coolant. The porous screen 60 supports the separating medium 38 within the upper cylindrical tube 34 of the separating column 28 above the collecting medium 62 within the lower cylindrical tube 58 of the collecting column 46, being held at its edges between the two tubes 34 and 58 and the semipermeable membrane 64 supports the collecting medium 62, being held to the outer surface of the lower cylindrical tube 58 at its edges by O-ring 66 to close the bottom end of the lower cylindrical tube 58.

To provide contact between the source 52 of positive electrical potential and the bottom of the collecting medium 62, the lower buffer section 48 includes a cylindrical container 70 having a circular bottom wall and tubular side walls opening upwardly toward the bottom of the collecting column 46. A buffer solution 72 is within the container 70, filling it to a level where it contacts the semipermeable membrane 64 and an electrode connected to the source 52 of positive electrical potential which electrode is immersed in the buffer solution.

To permit the separated molecular species to be removed from the collecting column 46 for observation or collection in different containers, the fluid exit section 54 includes a channel 74 communicating with the top of the collecting column 62 and extending vertically through the walls of the upper cylindrical tube 34. A tube 76 communicates with the channel 74 at a counterbore in the top of the cylindrical outer tube 34 so that the collecting medium can be forced out of the collecting section 16 through the channel 74 and the tube 76 into another receptical for observation or into containers, with each molecular species being separated into a different container.

The fluid control section 50 of the collecting section 16 includes a flexible hose 78, a glass tube 80 extending through the wall of the lower cylindrical tube 58 to communicate at one end with the bottom of the collecting column 62 and at the other end with the flexible hose 78, a three-way valve 82 communicating with the flexible hose 78 to control the flow of fluid therethrough, a syringe 84 communicating with the flexible hose 78, and a denses fluid 86 in the syringe 84 whereby the syringe 84 can force the dense fluid 86 into the bottom of the lower cylindrical tube 58 to float the density gradient column through the fluid exit section 54.

The three-way valve 82 may be positioned to: (1) bring a density gradient former (not shown) into communication with the bottom of the collecting column 62 through the flexible hose 78 and the glass tube 80 thereby establishing a density gradient in the lower cylindrical tube 58; (2) bring the syringe 84 into communication with the bottom of the lower cylindrical tube 58 to force a dense liquid 86 beneath the collecting medium and thus force the collecting medium through the exit section 54; and (3) seal or close the flexible hose 78.

Figure 3:
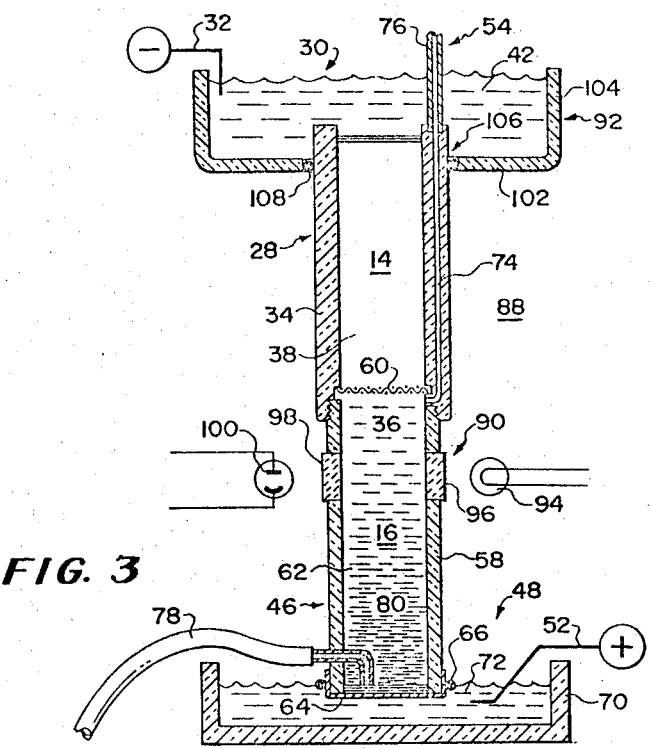
FIG. 3 is a fragmentary, elevational, sectional view, taken along a vertical axis of an electrophoresis apparatus that includes another embodiment of the invention.

In FIG. 3, there is shown another embodiment of electrophoresis apparatus 88 which differs from the electrophoresis apparatus 10 is some respects and is the same in other respects. The parts of the electrophoresis apparatus 88 that are the same as parts of the electrophoresis apparatus 10 are indicated by the same reference numbers in FIGS. 2 and 3 and the parts that differ in the electrophoresis apparatus 88 are indicated by different reference numbers.

The electrophoresis apparatus 88 differs from the electrophoresis apparatus 10 by not having an outer tubular frame and by including an optical cell 90 as part of the collecting section 16. Also, the buffer solution 42 is contained in a separate container 92 rather than in a top portion of a tubular frame as in the electrophoresis apparatus 10.

The optical cell 90 includes four principal components aligned in a light path through the lower cylindrical tube 58 and the collecting medium 62, which are in the order named: (1) an ultraviolet lamp 94; (2) a first transparent window 96 in the wall of the lower cylindrical tube 58; (3) a second transparent window 98 in the wall of the lower cylindrical tube 58 diametrically opposite to the window 96; and (4) an ultraviolet photocell 100. This arrangement permits the monitoring of light absorbing zones in the collecting medium 62 as these zones leave the separating medium 38 thus showing when the desired zone or zones have come into the collecting medium. In the embodiment of electrophoresis apparatus 88, the upper cylindrical tube 34 is held in a clamp (not shown) of any suitable type to support the electrophoresis apparatus 88 in an upright position since there is no frame for this purpose. To retain the buffer solution 42 in contact with the electrode connected to the source 32 of negative electric potential and with the separating column 28, the container 92 comprises a horizontal bottom plate 102 having an upwardly extending cylindrical wall 104 around its edge to hold the buffer solution 42 and a central circular aperture 106 that receives the upper cylindrical tube 34, being supported thereon by an o-ring 108 sealing the container 92 to the wall of the upper cylindrical tube 34.

Figure 4:
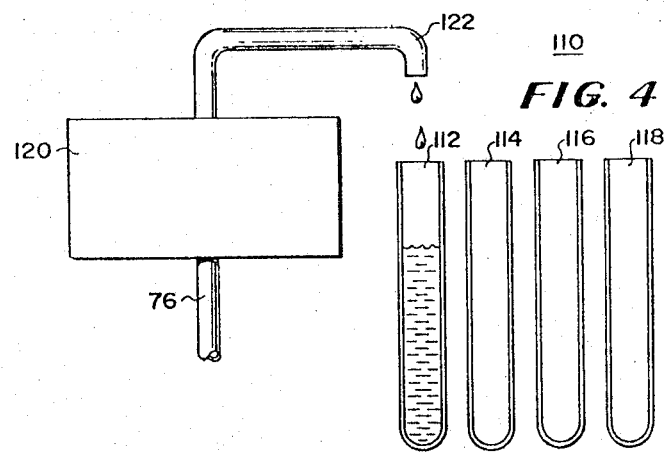
FIG. 4 is a fragmentary elevational, diagrammatic view of a portion of an electrophoresis apparatus forming an embodiment of the invention.

In FIG. 4, there is shown a portion of a fractionating apparatus 110 that is used in connection with either the electrophoresis apparatus 10 or the electrophoresis apparatus 88 to collect the different molecular species in different containers such as the test tubes 112, 114, 116 and 118 shown in FIG. 4. This apparatus may be part of conventional fractionating apparatus such as the apparatus disclosed in the aforementioned U.S. Pat. Nos. 3,151,639 and 3,453,200.

To deposit each of the different molecular species in different ones of the test tubes 112–118, the fractionating apparatus 110 includes a concentration sensor 120 and a section of the glass tubing 76 (FIGS. 2 and 4)

formed into a downspout 122. The concentration sensor 120, which may be any suitable type such as one of those described in connection with the optical cell in the aforementioned patents, is positioned around the glass tube 76 to detect the different zones having different molecular species as they flow upwardly through the tube 76 so that each molecular species may be deposited into a different one of the test tubes 112–118, if desired, by moving the test tubes after each zone is deposited.

Figure 5:
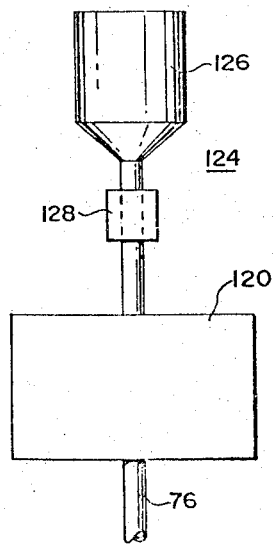
FIg. 5 is a fragmentary, elevational, diagrammatic view of a portion of an electrophoresis apparatus forming another embodiment of the invention that may be included with or instead of the embodiment shown in FIG. 4.

In FIG. 5, there is shown auxiliary apparatus 124 which may be used with electrophoresis apparatus 10 or 88 instead of or with the portion 110 of the fractionating apparatus shown in FIG. 4. The auxiliary apparatus 124 is useful in observing the separated zones containing different molecular species.

The auxiliary apparatus 124 includes a reservoir 126 connected to the glass tube 76 above the concetration sensor 120 by a stopper 128. With this arrangement, the collecting medium 62 is moved into the reservoir to observe the zones. If the zones having the different molecular species are not separated sufficiently for collection, the collecting medium 62 (FIG. 2) is returned to the collecting column 46 by pulling the plunger of the syringe 84 to remove some of the dense liquid 86 from the collecting column 46. With the collecting medium back in the collecting column 46, the separation of the molecular species may be increased by further electrophoresis in the collecting column.

The stopper 128 may be conveniently used to attach a downspout to the glass tube 76 for the purpose of depositing the different zones of the collecting column 62 into different ones of the test tubes 112–118 (FIG. 4) in a manner similar to that described in connection with FIG. 4.

OPERATION OF THE ELECTROPHORESIS APPARATUS

Before operation, the electrophoresis apparatus 10 and 88 of this invention are assembled with a sample 44 in place within the upper cylindrical tube 34 on top of the separating medium 38 and a potential is applied across the separating and collecting columns 28 and 46 to separate the different molecular species of the sample.

During operation, the different molecular species migrate at different rates so as to form zones in the separating medium, with each zone containing different molecular species, and the zones are moved into the collecting medium by electrophoresis. Once the zones are in the collecting medium, any of several operations may be performed on the collecting medium, such as: (1) depositing each zone in a different container; (2) observing the zones and, if they are separated to a sufficient degree, depositing each of them in a separate container; or (3) observing the zones and, if they are not separated to a sufficient degree, subjecting the collecting medium to further electrophoresis to obtain further separation of the zones.

In preparing the electrophoresis apparatuses 10 or 88 shown in FIGS. 2 and 3 respectively for operation, the separating column 28 and the collecting column 46 are assembled together, the lower end of the upper cylindrical tube 34 being threaded onto the upper end of the lower cylindrical tube 58, with the porous screen 60 between them. The semiporous membrane 64 closes the lower end of the lower cylindrical tube 58, being held near its periphery to the walls of the lower cylindrical tube 58 over which it is folded by the o-ring 66. In the electrophoresis apparatus 10, the separating column 28 and the collecting column 46 are mounted in the frame 12 which forms the buffer section 30 in the electrophoresis apparatus 88. The separating column 28 and the collecting column 46 are separately mounted so that the optical unit 94 is not impeded by a frame.

The separating medium 38 is located in the upper cylindrical tube 34 and rests upon the porous membrane 60. Any one of several different types of separating media may be selected to be included in the tube 34. The particular type in each case is selected because it has some characteristic that enable it to separate at least some of the molecular species of interest in a superior manner. When the selected separating medium is a solid or a semi-solid, this invention has maximun benefits because the invention provides a novel method for efficiently collecting the species once they have been separated in the separating medium by electrophoresis.

The collecting medium 62 is inserted into the collecting column 46 through the three-way valve 82, the flexible tube 78, and the tube 80, generally by a density gradient former. The collecting medium 62 is brought into intimate contact with the separating medium 38, with the air in the column escaping through the channel 74 in the upper cylindrical tube 34. An excess of the collecting medium may be forced into the channel 74 to be sure that the collecting medium 62 in the collecting column 46 is in intimate contact with the separating medium 38.

In selecting the collecting medium, the primary criterion is that the collecting medium must be capable of bulk flow. This characteristic permits the species to be efficiently collected according to the method of this invention. The particular medium is selected from among those capable of bulk flow to provide still better separation of some of the molecular species. Under some circumstances, it is possible to obtain the best separation of some of the molecular species in a sample by electrophoresis in the separating medium and the best separation of other species by further electrophoresis in the collecting medium.

In selecting the separating and collecting media, the changes in the mobility of the molecular species at the interface of the two media are also considered. By using a collecting medium that provides greater velocity to the migrating species than that provided by the separating medium, a further separation of the zones and a reduction in the concentration of the molecules of the species within the zones are achieved and by using a collecting medium that provides lower velocity to the migrating species, the distance between zones is reduced and the concentration within each zone is increased. Of course, the two media may provide the same velocity so that there is no such change at the interface between the media. Moreover, three or more media, each providing a different velocity may be included to provide increased separation. When three media are included, the central media may be relatively low in volume.

Before the electrophoresis is performed, the sample 44 containing the mixture of molecular species is deposited on to top of the separating medium 38, the buffer solution is deposited in the upper and lower buffer sections 30 and 48 where it contacts the electrodes and the semipermeable membrane 64 to establish an electrical potential across the sample, the separating column and the collecting column. The mixture of molecular species is suspended in a dense liquid within the sample 44 so that it is not displaced from the top of the separating column 28 by the buffer solution 42.

To be sure that the collecting medium 62 is intimate contact with the separating medium 38, the plunger of the syringe 84 may be depressed to force a dense liquid 86 into the bottom of the collecting column 46, where it floats the collecting medium 62 upwardly until it is in intimate contact with the bottom of the separating medium and has entered the channel 74.

After the electrophoresis apparatus has been prepared, an electric potential is applied across the separating column 28 and the collecting column 46 to cause the migration of the molecular species in the sample through the separating medium and the collecting medium. As the molecular species move through the separating medium, different species migrate at different rates and zones are formed, each containing different molecular species. Closely spaced molecular species are separated with high resolution by some solid or semi-solid separating media such as by certain polyacrylamides.

The spaced-apart zones formed in the separating medium migrate into the collecting medium while maintaining their identity as discrete zones. At the interface between the separating and collecting media, the rate of migration may increase, decrease or remain the same depending on the characteristics of the media, such as their relative pH, degree of ionization, conductivity, chemical composition and the like characteristics. If the velocity of migration is increased, the individual migrating units will become further spaced from each other at the interface, resulting in a decrease of their concentration within a zone and an increase in the distance between zones. Similarly, if the velocity of migration is decreased, the individual migrating units will be moved more closely together at the interface, resulting in an increase in the concentration within a zone and a decrease in the distance between zones. The separation of the species continues in the collecting medium and, under some circumstances, a better resolution of some species of interest is achieved in the collecting medium than could be achieved in the separating medium.

After the zones have entered the collecting medium, they are normally scanned and collected.

Firstly, the zones are scanned to locate the zones of interest and to determine if the separation is complete. If the separation between zones is complete, the zones may be deposited in containers, and if not, the electrophoresis may be continued.

In the embodiment of electrophoresis apparatus 88 shown in FIG. 3, the different zones are scanned by the optical cell 90 as they move past the transparent windows 96 and 98, thus showing when the zone or zones of interest have come into the collecting medium. In both embodiments of electrophoresis apparatuses 10 and 88 shown in FIGS. 2 and 3 respectively, when used with the apparatus shown in FIG. 5, the plunger of the syringe 50 (FIG. 2) may be depressed to force the dense liquid 86 into the collecting column 46, floating the collecting medium 62 with the zone or zones of interest in it through the exit section 54 and through the concentration sensor 120 into the reservoir 126 to scan and locate the zones of interest as they pass through. Later, the collecting medium can be returned for further electrophoresis if the zone of interest is not sufficiently separated. With either of these scanning methods the zones may be observed before the electrophoresis is finally terminated so as to prevent premature depositing of the zones into different containers.

Secondly, if the species of interest are sufficiently separated, each zone or each of certain zones or certain groups of zones may be deposited in a different container, after which, the molecular species in the zone or zones are removed from the collecting medium by dialyses or other suitable method.

One method of locating and depositing the zones in different containers is to removed the separating and collecting columns 28 and 46 from the electrophoresis apparatuses 10 and 88 and to unscrew the collecting column 46 from the separating column 28. The collecting medium 62 is then processed in a fraction collector of the type described in the aforementioned U.S. Pat. Nos. 3,151,639 and 3,453,200 to deposit the zones or groups of zones in different containers. Before the separating and collecting columns 28 and 46 are removed from the electrophoresis apparatus 10, the water is drained from the water jacket in the frame 12.

Another method of locating and depositing the zone or zones of interest in a container or in different containers, usable with either the embodiment of FIGS. 2 or 3 when the apparatus of FIG. 4 is included, is to depress the plunger of the syringe 50 (FIG. 2) to force the dense liquid 86 into the bottom of the collecting column 46. The dense liquid floats the collecting medium 62 upwardly, with the collecting medium flowing by bulk flow without intermixing the different zones within it, through the exit section 54, through the concentration sensor 120, which may be an optical or chemical sensor, and through the downspout 122 into the tubes 112–118, the concentration sensor 120 moving the tubes so that the zone or zones of interest are deposited in different tubes and not intermingled.

The methods and apparatuses of this invention have several advantages such as: (1) they enable different molecular species to be separated by electrophoresis in a solid or semisolid medium and to be collected into separate containers without excessive dilution and without fragmentation of the solid or semisolid medium; (2) they enable the molecular species that have been separated by electrophoresis in a solid or semisolid medium to be collected by standard fraction collectors; (3) they permit the zones separated by electrophoresis in a solid or semisolid medium to be readily scanned and observed with the possibility of continuing the electrophoresis if separating is not complete; (4) they combine the beneficial results of separation in a density gradient column with the beneficial results of separation in a gel; and (5) they permit a greater resolution of some mixtures of molecular species into its different species by electrophoresis than can be obtained by electrophoresis in a single gel or density gradient column.

Although a specific embodiment has been described with some particularity, many modifications and variations in the preferred embodiment are possible without deviating from the invention. Accordingly, it is to be understood that, within the scope of the appended claims, the invention can be practiced otherwise than as specifically described.

What is claimed is:

1. Apparatus for electrophoresis of a mixture of different molecular species comprising:
   a first anticonvection medium;
   a second anticonvection medium;
   electric means for substantially separating by electrophoresis at least some of said different molecular species in said first anticonvection medium and for moving said separated molecular species by electrophoresis into said second anticonvection medium;
   said second anticonvection medium differing from said first anticonvection medium at least by being more capable of bulk flow, whereby the collection of the separated molecular species is facilitated;
   scanning means for locating said different molecular species in said second anticonvection medium; and
   conduit means communicating with the bottom of said second anticonvection medium for introducing a movable support means to move said second anticonvection medium with respect to said scanning means.

2. Apparatus according to claim 1 further including:
   passageway means communicating with an upper portion of said second anticonvection medium;
   said passageway means passing adjacent to said scanning means; and
   said conduit means including reversible means for moving said second anticonvection medium through said passageway means.

3. Apparatus according to claim 2 in which said reversible means includes:
   flow means communicating with said second anticonvection medium;
   a liquid more dense than said second anticonvection medium; and
   means for moving said liquid through said flow means into said second anticonvection medium, whereby said more dense liquid floats said second anticonvection medium through said passageway.

4. Apparatus according to claim 3 in which said scanning means includes an optical cell adapted to communicate with said second anticonvection medium, whereby the concentration of said second anticonvection medium is measured to locate said different molecular species.

5. Apparatus according to claim 4 in which said passageway means comprises:
   an exit passageway adapted to communicate with the top of said second anticonvection medium at one end and having a discharge opening at its other end;
   sensing means adapted to communicate with said second anticonvection medium in said exit passageway;
   said reversible means including a means for forcing said second anticonvection medium through said exit passageway and from said discharge opening;
   a plurality of different containers; and
   control means for moving a different container under the discharge opening to collect certain of said different molecular species that are detected by said concentration sensing means, whereby at least one portion of said second anticonvection medium containing at least one of said different molecular species is collected into a container separate from the remainder of said second anticonvection medium.

6. Apparatus according to claim 2 in which said electric means includes series potential means for applying an electric potential across said mixture of different molecular species, said first anticonvection medium and said second anticonvection medium in series, whereby at least some of said different molecular species are substantially separated in said first anticonvection medium and moved from said first anticonvection medium into said second anticonvection medium.

7. Apparatus according to claim 6 in which said second anticonvection medium comprises a material that provides a greater velocity of migration to at least some of said different molecular species from that provided by said first anticonvection medium whereby the distance between different separated molecular species is changed at the interface between said first anticonvection medium and said second anticonvection medium.

8. Apparatus according to claim 6 further including a third anticonvection medium electrically in series with and located between said first and second anticonvection media, said third anticonvection medium providing a different rate of migration to at least some of said different molecular species from said first anticonvection medium.

9. Apparatus according to claim 6 in which said first anticonvection medium is a solid and said second anticonvection medium is a density gradient column.

10. Apparatus according to claim 6 in which said first anticonvection medium is a semisolid and said second anticonvection medium is a density gradient column.

11. Apparatus according to claim 6 in which said first anticonvection medium is a gel and said second anticonvection medium is a granular medium.

12. Apparatus according to claim 1 in which said electric means includes:
   first means for applying an electric potential in a first direction across said first anticonvection means and said mixture of different molecular species in series, whereby at least some of said different molecular species are separeted into zones; and
   second means for applying an electric potential across said first and second anticonvection media in a direction transverse to said first direction after said zones have been formed, whereby said zones are moved into said second anticonvection medium substantially in parallel.

13. Apparatus according to claim 12 further including a third anticonvection medium electrically in series with and located between said first and second anticonvection media, said third anticonvection medium providing a different rate of migration to at least some of said different molecular species from said first anticonvection medium.

14. Apparatus according to claim 12 in which said first anticonvection medium is a solid and said second anticonvection medium is a granular column.

15. Apparatus according to claim 12 in which said first anticonvection medium is a semisolid and said second anticonvection medium is a granular column.

16. Apparatus according to claim 1 further including a third anticonvection medium electrically in series with and located between said first and second anticonvection media.

17. Apparatus according to claim 16 in which said third anticonvection medium provides a different rate of migration to at least some of said different molecular species from said first anticonvection medium.

18. Apparatus according to claim 16 further including:
a passageway communicating with an upper portion of said second anticonvection medium;
an optical cell communicating with said second anticonvection medium in said passageway, whereby said different molecular species are observed as they move with said second anticonvection medium;
flow means communicating with said second anticonvection medium;
a liquid more dense than said second anticonvection medium; and
means for moving said liquid through said flow means and into said second anticonvection medium, whereby said more dense liquid floats said anticonvection medium through said passageway.

19. Apparatus according to claim 2 in which said electric means includes:
first means for applying an electric potential in a first direction across said first anticonvection means and said mixture of different molecular species in series, whereby at least some of said different molecular species are separated into zones; and
second means for applying an electric potential across said first and second anticonvection media in a direction transverse to said first direction after said zones have formed, whereby said zones are moved into said second anticonvection medium substantially in parallel.

20. Apparatus according to claim 19 further including:
a passageway communicating with an upper portion of said second anticonvection medium;
an optical cell adapted to communicate with said second anticonvection medium in said passageway, whereby said different molecular species are observed as they move in said passageways;
flow means communicating with said second anticonvection medium;
a liquid more dense than second anticonvection medium; and
means for moving said liquid through said conduit means and into said second anticonvection medium, whereby said more dense liquid floats said anticonvection medium through the passageway.

21. Apparatus for electrophoresis of a mixture of different molecular species comprising:
a first ancitonvection medium;
a second anticonvection medium;
electric means for substantially separating by electrophoresis at least some of said different molecular species in said first anticonvection medium and for moving said separated molecular species by electrophoresis into said second anticonvection medium;
said second anticonvection medium differing from said first anticonvection medium at least by being more capable of bulk flow, whereby the collection of the separated molecular species is facilitated;
scanning means for locating said different molecular species in said second anticonvection medium; and reversible means for moving said second anticonvection medium with respect to said scanning means and returning said second anticonvection medium into position for further processing.

22. Apparatus according to claim 21 in which said reversible means includes;
a passageway communicating with an upper portion of said second anticonvection medium;
said passageway passing adjacent to said scanning means; and
pump means for moving said second anticonvection medium through said passageway.

23. Apparatus according to claim 22 in which said pump means includes:
flow means communicating with said second anticonvection medium;
a liquid more dense than said second anticonvection medium; and
means for moving said liquid through said conduit means into said second anticonvection medium, whereby said more dense liquid floats said second anticonvection medium through said passageway.

* * * * *

UNITED STATES PATENT OFFICE
CERTIFICATE OF CORRECTION

Patent No. 3,847,785            Dated November 12, 1974

Inventor(s) William B. Allington

It is certified that error appears in the above-identified patent and that said Letters Patent are hereby corrected as shown below:

The title of this patent is changed from "ELECTROPHORESIS APARATUS" to --ELECTROPHORESIS APPARATUS--.

Column 1, line 1, "APARATUS" is changed to--APPARATUS--.

Column 3, line 21, "bulk" is changed to--receive--.

Column 3, line 58, "FIg." is changed to--FIG.--.

Column 4, line 30, "separting" is changed to--separating--.

Column 5, line 1, "liquids" is changed to--liquid--.

Column 5, line 5, "bylk" is changed to--bulk--.

Column 5, line 20, "of" is changed to--or--.

Column 6, line 14, "a" is changed to --in--.

Column 6, line 48, "mediuim" is changed to--medium--.

Column 7, line 5, "descreased" is changed to--decreased--.

Column 7, line 7, "concentraion" is changed to--concentration--.

UNITED STATES PATENT OFFICE
CERTIFICATE OF CORRECTION

Patent No. 3,847,785      Dated November 12, 1974

Inventor(s) William B. Allington      PAGE - 2

It is certified that error appears in the above-identified patent and that said Letters Patent are hereby corrected as shown below:

Column 7, line 12, "of" is changed to--or--.

Column 7, line 14, "mdeia" is changed to--media--.

Column 9, line 63, "denses" is changed to--dense--.

Column 11, line 18, "concetration" is changed to--concentration--.

Column 12, line 65, after "on" delete "to".

Column 13, line 7, after "is" insert "in".

Column 14, line 15, "removed" is changed to--remove--.

Column 18, line 28, change the semicolon to a colon.

Signed and sealed this 3rd day of June 1975.

(SEAL)
Attest:

RUTH C. MASON
Attesting Officer

C. MARSHALL DANN
Commissioner of Patents
and Trademarks